Feb. 23, 1943. J. A. BUCHANAN 2,311,637
ACCELEROMETER
Filed Oct. 3, 1941
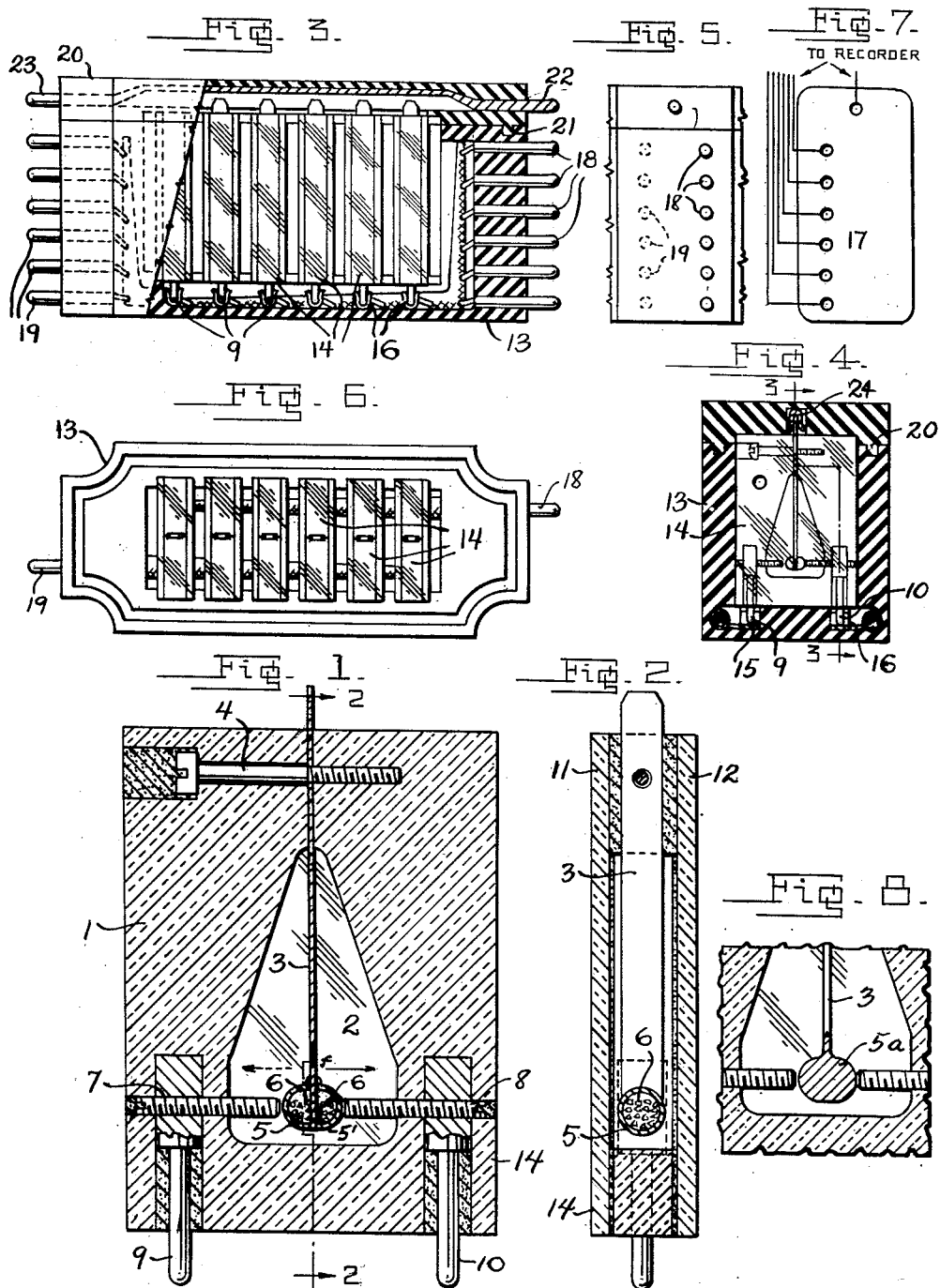
INVENTOR
James A. Buchanan
BY
ATTORNEY Patented Feb. 23, 1943

2,311,637

UNITED STATES PATENT OFFICE 2,311,637

ACCELEROMETER

James A. Buchanan, United States Navy

Application October 3, 1941, Serial No. 413,476

15 Claims. (Cl. 200—52)

(Granted under the act of March 3, 1883, as
amended April 30, 1928; 370 O. G. 757)

My invention relates in general to accelerometers and specifically to accelerometers of the classifying type which may be calibrated to indicate the magnitude of acceleration imparted thereto.

My accelerator is utilized to indicate the acceleration acquired by any moving object, such, for example, as a vehicle. Such acceleration may either be positive or negative, that is, it is a vector quantity. Deceleration is a term sometimes applied to negative acceleration.

My invention is especially applicable to aircraft where accelerations up to 10 g. (gravity units) or more are sometimes attained. In view of the fact that the trend in airplane design is toward higher and higher speeds, it becomes increasingly important that one should have accurate knowledge of the characteristics of accelerations imparted to the airplane, since the structural design, which is obviously a prime factor in determining maximum safe performance, is intimately related to the accelerations and therefore forces to which the structure is subjected.

Also it is well known that the pilot of an airplane is able to withstand only a certain application of acceleration and still retain his full faculties for controlling the operation of the airplane. Acceleration in excess of such maximum conditions may cause temporary blindness ("blackout") or unconsciousness, permanent physical injury or even death to the pilot with attendant lessening or loss of control of the airplane.

Further applications of the instrumentation made available by my invention will be in the measurement of accelerations involved in studies of landing gear, catapults and arresting-gear for aircraft, relative steadiness of small boats and other water-supported craft, riding qualities and impact reactions of automotive and railway vehicles and laboratory drop or impact tests.

It is a broad object of my invention to provide an improved type of accelerometer which is economical to manufacture, of such lightness, compactness and convenience in use that it may be used in applications for which there is at present no satisfactory substitute, one that is waterproof, dust-proof and tamper-proof, accurate and dependable in operation under the most severe conditions.

It is a feature of my invention to provide individual classifying accelerometer cell units which, after assembly and calibration, are permanently sealed, thereby rendering each unit water-proof, dust-proof and tamper-proof and obviating subsequent disturbance, either by accident or by deliberate act, of its pre-set calibration. Also being transparent in its preferred embodiment, each unit may be visually inspected, without disassembly, to ascertain its continued fitness for service.

It is another feature of my invention to provide cell units of the type described in such form that they may be attached singly to objects, the acceleration of which is to be investigated or they may be readily assembled in preselected and quickly varied groups for such attachment. The structural characteristics of my accelerometer are such that a group of them, each of which may be calibrated to respond to a different acceleration (in steps of one-half g. for example), may be readily incorporated in an assembly. This feature of my invention provides that combinations of sealed individual cells may be quickly varied so as to be suitable for use according to the characteristics of the acceleration to be measured.

A specific object of my invention is to provide an accelerometer of the classifying type having an acceleration responsive contact movable into and out of an engagement with a fixed contact in accordance with the characteristics of acceleration imparted to the accelerometer.

Another specific object is to provide an accelerometer having an acceleration responsive contact element which is normally biased to engage a stationary contact but movable out of such engagement upon subjecting the accelerometer to a pre-calculated acceleration.

Another specific object is to provide an accelerometer including therein an acceleration-responsive element comprising a cantilever spring having a mass disposed at its free end to yieldingly engage or disengage fixed contacts.

Another object of my invention is to provide an accelerometer having an acceleration responsive element comprising a cantilever spring including a mass disposed at its free end, said mass comprising two closed shell members, each of which contains a plurality of freely movable mass particles to provide internal damping, thereby eliminating chattering and deleterious effects of parasitic vibrations which are frequently superimposed upon basic accelerations to be measured.

A more specific object is to provide an accelerometer in which the acceleration responsive element comprises a cantilever spring having a shell containing granulated material affixed to its free end which is positioned for movement between a pair of juxtaposed stationary contacts.

A further object of my invention is to provide an accelerometer of the class described in which the acceleration responsive element therein comprises a cantilever spring with a mass affixed to its free end which is biased to engage one stationary contact under accelerations of less than a pre-determined critical magnitude but movable away therefrom upon acquiring an acceleration exceeding such critical value to engage an oppositely disposed second stationary contact, each of said stationary contacts being made adjustable with respect to the movable acceleration responsive element to thereby vary the acceleration at which the acceleration responsive element will respond as well as the gap which it traverses in moving from one contact to the other.

A still more specific object of my invention is to provide an accelerometer comprising a body portion of non-conductive material having a chamber formed therein in which an acceleration responsive element, forming a movable contact for controlling an electric circuit, is positioned for movement between a pair of juxtaposed stationary contacts, each such contact being made adjustable with respect to the acceleration responsive element by threaded engagement with a plug terminal in order to permit the accelerometer to be calibrated for a pre-determined response throughout a range of acceleration magnitudes.

A further object of my invention is to provide a housing for positioning therein a plurality of accelerometer units, in which the various terminals of each such unit are brought out to a quick-detachable connector to thereby permit the accelerometer cell units to be brought quickly into operative position and the combination of cells held in such housing may be quickly varied as the need therefor arises.

A further specific object is to provide a housing for positioning therein a plurality of units of the classifying type in which all of the "make" contacts of said units are brought to one multi-terminal quick-detachable connector and all of the "break" contacts of said units are brought to a second multi-terminal connector in order that the assembly of any desired combination of accelerometer units may be quickly connected for use either for controlling an electric circuit connected between the acceleration responsive element and the "make" contact of each such unit or between the acceleration responsive element and the "break" contact thereof.

A still more specific object of my invention is to provide a housing for supporting therein a plurality of accelerometers of the classifying type in which all of the "make" contacts of the units are brought out to terminals forming one half of a multi-terminal plug-in socket assembly and all the "break" contacts are brought out to terminals forming one half of a second such socket assembly, such arrangement permitting the accelerometer assembly to be quickly connected for controlling electric circuits utilizing the movable acceleration responsive member and the "make" contact or the acceleration responsive member and the "break" contact of each accelerometer unit.

These and other objects of my invention will become apparent from the detailed description to follow and from the drawing attached in which—

Fig. 1 is an enlarged sectional side view of a preferred embodiment of an accelerometer unit constructed in accordance with my invention.

Fig. 2 is a view taken on lines 2—2 of Fig. 1.

Fig. 3 is a side view partly in elevation and partly in section illustrating a housing for incorporating a group of accelerometer units which may be of the type illustrated in Fig. 1, each of which may be calibrated to respond to a different critical acceleration, and is taken on line 3—3 of Fig. 4.

Fig. 4 is a transverse section taken through the body of the housing of Fig. 3 with an accelerometer unit in position.

Fig. 5 is a fragmentary end view of Fig. 3.

Fig. 6 is a plan view of the housing shown in Fig. 3 with the cover thereof removed.

Fig. 7 is an end view of a socket for receiving the plug members of the housing shown in Fig. 3, and Fig. 8 is a modified form of acceleration responsive member.

Referring now in particular to Fig. 1, my improved accelerometer unit comprises a central body portion 1 of non-conductive material. Although, for reasons which will obviously be apparent hereafter, the body portion 1 is made of a plastic material, preferably transparent, which is electrically non-conductive such, for example, as a synthetic resin now sold on the market under the trade name of "Lucite," it will be evident that such body may equally as well be made of any other suitable material. If made of metal, the various elements included therein, which are incorporated in electric circuits, would obviously be suitably insulated. An opening 2 is formed in the body 1 to permit a biasing member 3 to operate therein. Leaf member 3 is formed from any suitable spring material, and its characteristics will be principally determined by the characteristics of the accelerations which the accelerometer will be required to classify. Although I prefer to make leaf member 3 relatively flat in cross-section, it will be evident that it may take some other configuration, such as, for example, round, oval, square, or other polygonal shape. In my preferred embodiments, I find it advantageous to use phosphor-bronze spring material because of its relatively low modulus of elasticity and its non-magnetic properties. One end thereof is rigidly fixed within the body portion of the accelerometer by any suitable means, such as screw 4. The other end of member 3 has affixed thereto an acceleration responsive mass. Although the mass may be made solid, as shown in Fig. 8, member 5a, I prefer to utilize a pair of closed shells 5—5' containing comminuted, powdered or granulated material 6, loosely contained within the shells, in order to provide internal damping of the acceleration responsive element to thereby reduce chattering and the effects of parasitic vibrations to a minimum and hence improve the operating characteristics of the unit. The greatest damping benefit will be obtained by the use of a maximum effective amount of loosely confined material 6, which is of great density and of maximum angle of repose, such as, for example, dry, powdered tungsten.

Member 3 and shells 5—5' are movable in cantilever fashion between a pair of juxtaposed contacts 7 and 8 which are affixed in position by threaded engagement through plug-terminals 9 and 10, the latter being provided in order that the accelerometer unit may be quickly placed in operative position within a casing, as will be described hereinafter in more detail.

In order to make the accelerometer unit non-subject to chance or deliberate disturbance as well as to permit visual inspection of the condition of the various elements of the accelerometer, I prefer to tightly secure, as by cementing, a pair of transparent cover members 11 and 12 to the central body member 1 as shown in Fig. 2 after the accelerometer unit has been assembled. When cover plates 11 and 12 are sealed and cemented to the central body member 1, the entire cell is unitary, having an internal cavity wherein the acceleration-sensitive spring-weight element and the cooperating contact stops are fully enclosed.

If desired, said cavity may be evacuated through one of the threaded openings provided for screws 7 and 8 or may be filled with an inert gas in order to prolong the life of the electrical contacts formed between members 5—5' and adjustable contact screws 7 and 8 respectively.

In calibrating the accelerometer unit, screw contact 8 is adjusted to engage the mass 5' in such a manner that a force $f$ is exerted in the direction shown by the solid arrow. The amount of such force will depend upon the effective weight or mass of the spring-weight combination and the critical acceleration to which the unit is to respond. The force $f$ will be increased as the acceleration to which the element is desired to be responsive also increases. Contact 7 is then adjusted so that a very small gap exists between the end thereof and the shell 5. Such calibration of the accelerometer element to respond to a particular predetermined acceleration may be conveniently accomplished by the use of well-known and established accelerometer calibrating devices, such as, a rotating table or beam, pendulum, vibrating beam or one of the drop-type of calibrators.

When the desired critical response for the accelerometer is such as to require an appreciable deflection of spring member 3, I prefer to deform the spring in such a manner that it will be approximately straight when in its critically deflected position.

Also it will be evident that other means may be utilized for biasing the shell 5' against contact 8. For example, a screw may be threaded through the body member 1 to project within the chamber 2 and engage leaf spring 3 at some point intermediate its fixed end and the mass. Or still another way to effect the biasing force would be to provide a coiled spring to engage the flat spring 3.

After calibration, I prefer to seal the screws 7 and 8 by any suitable fusible material in order to eliminate chance disturbance of the accelerometer cell due to moisture, dust or handling which would lessen the accuracy of the unit.

In operation, when the accelerometer unit 14 is subjected to an acceleration in the direction of the solid arrow, shell 5' will remain in contact until the forcing acceleration attains the magnitude for which the element has been set to respond. Acceleration in excess of this critical magnitude will cause member 5' to break contact with contact 8 and move through the pre-determined minute gap and establish contact between member 5 and contact 7, in accordance with the classic equation—force equals mass times acceleration, mass being constant. This relation between contacts, when in communication with suitable detecting means by appropriate electric connections to the outer connections of the spring element 3, and the "break" terminal 10, or the "make" terminal 9, provides for classification of the forcing acceleration as greater than or less than the critical magnitude pre-determined by calibration setting according to the response or lack of response registered by the detecting means.

The small gap between contacts which must be traversed before "make" contact can register affords additional means for isolating or controlling the effects of parasitic vibrations which frequently attend basic forcing accelerations, such, for instance, as may be derived from engine vibrations.

Forcing accelerations of opposite sign, that is, in the direction of the dotted arrow in Fig. 1 will produce no tendency for the mass 5' to change its relative position between contacts 7 and 8.

Referring now to Fig. 3, I have provided a casing 13 for supporting therein a plurality of accelerometer units 14 such, for example, as the unit illustrated in Figs. 1 and 2, each of which may be calibrated to respond to a different acceleration. In order that the accelerometer units 14 may be quickly interchanged, I prefer to include socket means 15 and 16 for receiving the plug-in members 9 and 10 respectively in each unit. It will be understood, however, that other means for quickly effecting electrical connection between the terminals of the individual cells and the casing 13 may be employed, such as, for example, spring connectors.

In accelerometry, it is frequently desirable to employ classifying accelerometers for which the detecting means is sometimes in conjunction with "breaking contacts" and at other times with "making contacts," the latter case introducing a suitable gap through which the acceleration-sensitive element must first move before registration. In my accelerometer, I use electric circuits (involving members 7 and 8, respectively) to convey to suitable detecting means the acts of making contact or breaking contact of the acceleration-sensitive element. Any such change-over from one circuit to the other may be effected in a minimum of time by the simple exchange of the cable terminal connector from one outlet on the case to the other. Accordingly, I have provided a quick-detachable connector comprising a multi-element socket 17, the front only of which is illustrated in Fig. 7 and two sets of plug-in members 18 and 19. Conductors from each of the sockets 15 terminate respectively in the set of plug-in members 19 disposed in one wall of housing 3 and conductors from each of the sockets 16 terminate respectively in the set of plug-in members 18 disposed in another wall of the housing.

A cover member 20 is provided for housing 13 and may be suitably fixed in position as by a tongue and groove assembly 21. In order that all of the acceleration responsive members 3 may be connected in common, I have provided a longitudinal socket 24 in cover member 13 for receiving the end of each member 3 which protrudes through the body of the accelerometer. Plug-in terminals 22 and 23, which are connected electrically with the longitudinal socket 24, are provided for use respectively with the sets of plug-in members 18 and 19.

It will be understood that the multiple connection arrangement on the housing may be either in the form of male plugs as shown or as sockets for receiving male plugs on the cable connection to the detecting means. It will be also understood that while a multiple connector has been shown with the terminals in line, a circular or other suitable arrangement of terminals may be employed with equal facility. It will be further understood that both of the multiple terminals 18 and 19 may be located on the same wall of the housing 13.

As illustrated in Fig. 7, electric circuits completed between the acceleration responsive element 3 and contacts 7 and 8 respectively of each accelerometer unit may be led to any suitable type of detecting means such, for example, as an electric recorder, one type being shown and described in my co-pending patent application Serial No. 417,375, filed October 31, 1941.

While the assembly illustrated in Figs. 3 to 5 inclusive is utilized in the present invention for housing a group of variously calibrated classification accelerometers for measuring linear acceleration, it will be evident that such an assembly can be used equally as well for housing a group of variously calibrated classification accelerometers for measuring angular acceleration such, for example, as the accelerometer illustrated in my co-pending patent application Serial No. 417,571, filed November 1, 1941.

An acceleration responsive mass for accelerometers, comprising a shell containing a plurality of mass particles to provide internal damping is not claimed per se in this application but forms the subject matter of my co-pending patent application, Serial No. 414,932, filed October 14, 1941.

It will be obvious that various other changes and modifications may be made in the structures disclosed herein without departing from the spirit and scope of my invention and I accordingly desire it to be understood that the claims appended hereto shall be limited only as is made necessary by the prior art.

This invention may be manufactured and used by or for the Government of the United States of America for governmental purposes without the payment of any royalties thereon or therefor.

Having now fully described my invention, I claim:

1. Apparatus of the class described comprising a body member of electrical insulator material having a chamber centrally therein, a slotted portion, and recess means in said body for receiving a pair of spaced and parallel plug terminals, each of said plugs being bored and tapped transversely of its longitudinal axis, a contact screw for each of said plugs, said screws being threaded into the tapped bores in said plugs and terminating in juxtaposed position within the body chamber, a spring leaf having a mass at one end thereof to constitute an acceleration responsive contact, means for supporting one end of the leaf in the slotted portion of the body member for cantilever movement of the leaf and mass within the body chamber between said contact screws, said leaf and mass being held in yielding engagement with one of said screws under conditions of less than a predetermined critical acceleration but movable to effect contact with the other screw opposite thereto upon acquiring an acceleration in excess of said critical value and transparent cover means conforming to the configuration of said body member for enclosing the chamber in said body.

2. In a housing for positioning therein a plurality of accelerometer units, each of which utilizes an acceleration responsive element forming one contact which is movable with respect to a stationary contact under precalculated forcing accelerations, the combination comprising, means for supporting said units in said housing, conductor means connecting each of said stationary contacts respectively with terminals of a multi-terminal quick-detachable connector and conductor means connecting all of said movable contacts to a common terminal of said connector.

3. In a housing for positioning therein a plurality of accelerometer units, each of which utilizes an acceleration responsive element forming one contact which is movable to engage a stationary contact under a predetermined acceleration, the combination comprising, means for supporting said units in said housing, conductor means connecting each of said stationary contacts with a terminal of a multi-terminal pull-apart connector and conductor means connecting all of said movable contacts to a common terminal of said connector.

4. In a housing for positioning therein a plurality of accelerometer units, each of which utilizes an acceleration responsive element forming one contact which is movable to break engagement with a stationary contact under a predetermined acceleration, the combination comprising, means for supporting said units in said housing, conductor means connecting each of said stationary contacts with a terminal of a multi-terminal pull-apart connector and conductor means connecting all of said movable contacts to a common terminal of said connector.

5. In a housing for supporting therein a plurality of accelerometer units, each of which utilizes an acceleration responsive member forming one contact movable in relation to a fixed contact to close an electric circuit connected through said fixed and movable contacts, the combination comprising, means for supporting said accelerometer units in spaced relation in said housing, conductor means connecting the fixed contact of each unit respectively to terminals forming one-half of a multi-terminal plug-in socket assembly and conductor means connecting all of said acceleration responsive members to a common terminal of said socket assembly.

6. In a housing for supporting therein a plurality of accelerometer units each of which utilizes an acceleration responsive element forming one contact movable between juxtaposed first and second stationary contacts to open and close electric circuits respectively connected between said acceleration responsive element and said stationary contacts, the combination comprising, means for supporting said accelerometer units in spaced relation in said housing, conductor means connecting the first stationary contact of each accelerometer respectively to terminals of one multi-terminal pull-apart connector, conductor means connecting the second stationary contact of each accelerometer respectively to terminals of a second multi-terminal pull-apart connector, and conductor means connecting all of said acceleration responsive elements to a common terminal in each of said connectors.

7. In a housing for supporting therein a plurality of accelerometer units each of which utilizes an acceleration responsive element forming one contact and movable under precalculated rates of acceleration between juxtaposed first and second stationary contacts to respectively open and close electric circuits connected between said movable contact and the stationary contacts of each unit, the combinaiton comprising, means for supporting said units in said housing, socket means for receiving the contacts of said units, conductor means connecting each socket for said first stationary contacts respectively with terminals forming one half of a multi-terminal plug-in socket assembly, conductor means connecting each socket for said second stationary contacts respectively with terminals of a second such socket assembly, and conductor means connecting all of said movable contacts with a common terminal in each said socket assembly.

8. In a housing for supporting therein a plurality of accelerometer units each of which utilizes an acceleration responsive element forming one contact and movable under precalculated rates of acceleration between juxtaposed first and second stationary contacts to respectively open and close electric circuits connected between said movable contact and the stationary contacts of each unit, the combination comprising, means for supporting said units in said housing, socket means disposed in a side wall for receiving the contacts of said units, conductor means connecting each socket for said first stationary contacts respectively with terminals disposed in an end wall and forming one half of a multi-terminal plug-in socket assembly, conductor means connecting each socket for said second stationary contacts respectively with terminals in the opposite end wall and forming one half of a second such socket assembly, and conductor means connecting all of said movable contacts with a common terminal in each said socket assembly.

9. In a housing for supporting therein a plurality of accelerometer units each of which utilizes an acceleration responsive element forming one contact and movable under precalculated rates of acceleration between juxtaposed first and second stationary contacts to respectively open and close electric circuits connected between said movable contact and the stationary contacts of each unit, the combination comprising, means for supporting said units in said housing, socket means for receiving the contacts of said units, conductor means connecting each socket for said first stationary contacts respectively with plug terminals forming a male half of a multi-terminal plug-in socket assembly, conductor means connecting each socket for said secondary stationary contacts respectively with plug terminals of a second such socket assembly, and conductor means connecting all of said movable contacts with a common plug terminal in each said socket assembly.

10. In a housing for supporting therein a plurality of accelerometer units each of which utilizes an acceleration responsive element forming one contact and movable under precalculated rates of acceleration between juxtaposed first and second stationary contacts to respectively open and close electric circuits connected between said movable contact and the stationary contacts of each unit, the combination comprising, means for supporting said units in said housing, socket means disposed in a side wall for receiving the contacts of said units, conductor means connecting each socket for said first stationary contacts respectively with plug terminals disposed in an end wall and forming the male half of one multi-terminal plug-in socket assembly, conductor mean connecting each socket for said second stationary contacts respectively with plug terminals in the opposite end wall and forming the male half of a second such socket assembly, and conductor means connecting all of said movable contacts with a common plug terminal in each said socket assembly.

11. A multi-element classifying accelerometer comprising a housing for supporting therein a plurality of individual accelerometer cell units, each of said individual units containing a contact element movable under pre-determined forcing acceleration conditions relative to a stationary contact for controlling an electric circuit incorporating said contacts and connected to terminals on the exterior of each of said individual cells, means for positioning said individual cells within said housing, means for effecting engagement between said cell terminals and complementary terminals disposed in said housing, and means adapted for connecting said housing terminals with accelerometer-response detecting means, said last means comprising a multiple-element quick-detachable connector.

12. An accelerometer unit adapted for classifying linear acceleration as less than or greater than a pre-determined magnitude, comprising a body member having walls defining a cavity therein, means for securing a plug terminal in a wall of said body member, said terminal being drilled and tapped normal to its longitudinal axis, a contact screw, said screw being threaded through the tapped opening in said terminal and extending within said body cavity, a cantilever spring member having its fixed end rigidly secured in a wall of said body member, said spring member extending within said body cavity, and a mass disposed at the free end of said spring member constituting a movable contact, said contact screw being adjusted to engage said movable contact and deflect said spring member to create a restoring force therein whereby said contact screw and said movable contact will be maintained in engagement when linear acceleration of said accelerometer unit is less than said pre-determined magnitude but will be disengaged when linear acceleration exceeds said pre-determined magnitude.

13. An accelerometer unit adapted for classifying linear acceleration as less than or greater than a pre-determined magnitude, comprising a body member having walls defining a cavity therein, means for securing a pair of plug terminals in a wall of said body member, each of said terminals being drilled and tapped normal to its longitudinal axis, a stationary contact screw for each of said terminals, said screws being threaded into the tapped openings in said terminals and extending within said body cavity in juxtaposition, a cantilever spring member having its fixed end rigidly secured in a wall of said body member, said spring member extending within said body cavity, and a mass disposed at the free end of said spring member constituting a contact movable between said stationary contacts, said spring member being biased to maintain engagement between said movable contact and one of said stationary contacts when linear acceleration of said accelerometer unit is less than said pre-determined magnitude but movable to effect engagement with the other stationary contact when acceleration exceeds said pre-determined magnitude.

14. The combination in claim 13 wherein said body member is made of electrically insulating material.

15. An accelerometer unit adapted for classifying linear acceleration as less than or greater than a pre-determined magnitude, comprising a body member having walls defining a cavity therein, means for securing a plug terminal in a wall of said body member, said terminal being drilled and tapped normal to its longitudinal axis, a contact screw, said screw being threaded through the tapped opening in said terminal and extending within said body cavity, a cantilever spring member having its fixed end rigidly secured in a wall of said body member, said spring member extending within said body cavity, and a mass disposed at the free end of said spring member constituting a movable contact, said spring member and contact carried thereby being biased away from said contact screw when linear acceleration of said accelerometer unit is less than said pre-determined magnitude but movable into engagement with said fixed contact when acceleration exceeds said pre-determined magnitude.

JAMES A. BUCHANAN.